United States Patent
Hill et al.

(10) Patent No.: US 6,400,870 B1
(45) Date of Patent: Jun. 4, 2002

(54) SYMMETRIC INTERFEROMETERS UNBALANCED BY USING LIGHT EXPOSURE TO TAILOR THE SPECTRAL BEHAVIOR

(75) Inventors: Kenneth O. Hill, Kanata (CA); Mohammed Nazrul Islam, Ann Arbor, MI (US)

(73) Assignee: Her Majesty the Queen in Right of Canada as represented by the Secretary of State for Industry, Ottawa (CA)

( * ) Notice: Subject to any disclaimer, the term of this patent is extended or adjusted under 35 U.S.C. 154(b) by 0 days.

(21) Appl. No.: 09/480,166

(22) Filed: Jan. 10, 2000

Related U.S. Application Data

(60) Provisional application No. 60/115,795, filed on Nov. 11, 1999.

(51) Int. Cl.$^7$ ................................................. G02B 6/26
(52) U.S. Cl. .......................... 385/39; 385/48; 385/50; 385/43; 385/3
(58) Field of Search ............................ 385/39, 48, 50, 385/42, 5, 14, 3

(56) References Cited

U.S. PATENT DOCUMENTS 5,315,422 A * 5/1994 Utaka et al.
5,506,925 A * 4/1996 Grenne et al.

* cited by examiner

*Primary Examiner*—Hung N. Ngo
(74) *Attorney, Agent, or Firm*—Lacasse & Associates

(57) ABSTRACT

Unbalanced Mach-Zehnder interferometers (MZI) are useful for a number of applications including wavelength filters, gain flattening or gain equalization elements, and band splitters or combiners. A MZI is comprised of two couplers surrounding a phase shifting region, which consists of two arms with differential propagation constants. We disclose a means of using light exposure to unbalance a symmetric MZI consisting of substantially the same lengths of substantially the same fiber. In particular, the index of refraction of a fiber can be increased by exposure to ultraviolet light, and the magnitude of the change can be increased by using higher germanium doping or by hydrogen loading the fiber. The magnitude of the phase shift can be controlled accurately by varying the fiber length exposed, the light exposure intensity, the light exposure time, and the hydrogen loading or fiber composition. In addition, exposing the other arm, of the MZI to trim back the phase shift can compensate any over-exposure of the fiber. By starting with a symmetric MZI made from substantially the same fiber, low polarization sensitivity or polarization dependent loss can be achieved, and the device can operate over a wider overall wavelength range. Also, by using a MZI with substantially the same lengths of fibers and by placing those fibers parallel to one another, low environmental sensitivity can be achieved. Moreover, the use of light exposure to unbalance the MZI has the advantage of enabling precise tailoring of the spectral response with ease of manufacturing and high yields. The MZI devices can be cascaded to achieve more complicated filtering functions in lattice devices such as Lyot-Ohman filters or Solc filters.

22 Claims, 6 Drawing Sheets

Light exposed segments

☐ Light exposed segments

SYMMETRIC INTERFEROMETERS UNBALANCED BY USING LIGHT EXPOSURE TO TAILOR THE SPECTRAL BEHAVIOR

This application claims benefit of Provisional Appln. Ser. No. 60/115,795 filed Jan. 11, 1999.

FIELD OF THE INVENTION

This invention relates to an optical filter and method of making an interferometric optical filter by irradiating one or more substantially similar waveguide arms with light of an intensity, wavelength and duration sufficient to vary the optical path length difference between the two arms to obtain a desired output response.

BACKGROUND OF THE INVENTION

Mach-Zehnder Interferometers (MZIs) are well-known devices in planar waveguide technology and in optical fibers. An MZI is comprised of two couplers having a phase shifting region therebetween which consists of two arms, 10a and 10b shown in FIG. 1, having differential propagation constants. Unbalancing the MZI, and more specifically the arms of the MZI produces a sinusoidally varying spectral output behavior as is shown in FIG. 5a useful in a number of filtering or gain shaping applications. In planar waveguides, such as those made in lithium niobate or poled polymer materials, the application of a voltage and use of the electro-optic effect is used to controllably unbalance the MZI. Fiber-optic based MZI's are often unbalanced by using different fiber lengths in each arm, using dissimilar fibers in the two arms such as fibres having different core radii, or by varying the core dimension by using a bi-conical taper in one of the arms. Notwithstanding, these solutions have their limitations; for example, different fiber lengths are undesirable because of packaging difficulties and a large temperature sensitivity. The use of dissimilar fibers have an unwanted polarization and wavelength sensitivity. Furthermore, the use of dissimilar fibres lessens the amount of control afforded in the manufacture process. The use of a fused biconical taper in one of the interferometer arms introduces an unwanted wavelength sensitivity.

In 1989 researchers at the Communications Research Center (CRC) in Ottawa, Ontario, Canada have shown that an unbalanced MZI can be made using dissimilar fiber fused taper couplers. In particular, the optical path lengths of the two arms are different because the two fibers fused together to make the MZI are dissimilar and, therefore, have different propagation constants (B. Malo, F. Bilodeau, K. O. Hill, D. C. Johnson and J. Albert, *Electronics Letters*, Oct. 12, 1989, Vol. 25, pp. 1416–1417). Then, in 1990 the same researchers at CRC used an unbalanced MZI with dissimilar fibers as a measurement tool for the purpose of measuring the ultra-violet light photosensitivity in germanium-doped silica fiber. This was described by B. Malo, K. A. Vineberg, F. Bilodeau, D. C. Johnson and K. O. Hill, in *Optics Letters*, Sep. 1, 1990, Vol. 15, pp. 953–955.

There are a number of limitations of using dissimilar fibers in an MZI. First, a residual polarization dependence and polarization dependent loss can result from the use of dissimilar fibers. Another problem is that the couplers can vary with frequency, limiting the wavelength range over which the device operates accurately. Also, the only tunable parameter during the MZI manufacturing process given two dissimilar fibers is the position of the tapers.

In contrast, using the same fiber in both arms of the MZI reduces the polarization dependence and increases the wavelength range of operation.

As an improvement to the measurement system, the CRC researchers have also used an MZI made from the same fiber. However, an MZI made from identical fibers of equal arm length is not useful for the measurement of small optical phase shifts because it is balanced. In order to create an optical path-length difference or imbalance between the two interferometer arms, they used a novel design in which one of the fibers is pre-tapered in the middle over a 13-mm length, reducing the core-mode effective index in the tapered region (F. Bilodeau, D. C. Johnson, B. Malo, K. A. Vineberg, K. O. Hill, T. F. Morse, A. Kilian and L. Reinhart, *Optics Letters*, Oct. 15, 1990, Vol. 15, pp. 1138–1140). Thus, a symmetric MZI I purposefully tapered in one arm of the MZI to unbalance it. This unbalanced MZI was then used to measure refractive index changes caused by light exposure by irradiating the untapered arm.

In summary, unbalanced MZIs have been made and used for the purpose of measuring the photosensitivity in one of the waveguides. Unbalancing was achieved by using different optical fibres and an another instance by introducing a taper in one of the arms thereby reducing the core-mode effective index in the tapered region.

Hermetically sealed MZI couplers are known to have good environmental stability by inserting two dissimilar fibers in a glass tube. In particular, these have been fabricated by inserting fibers with differing core diameters and index deltas into a glass tube doped with barium oxide. The tube is then heated and collapsed on the fibers. The collapsed tube is then drawn to provide for the two couplers. The magnitude of the coupling can be easily adjusted by changing the taper length as descried by D. A. Nolan, W. J. Miller, R. Irion, Optical Fiber Conference, February 1998, San Jose, Calif., *OFC'98 Technical Digest*, pp. 339–340. Fiber-based lattice devices have also been made by cascading different MZI's. These lattice filters are made by using three unequal couplers surrounding two different phase shifting regions (D. A. Nolan, IEEE International Passive Components Workshop, September 1998). In addition, using a series of MZI's can lead to filter synthesis using Fourier expansion for applications in band splitters and combiners and gain equalization (Y. P. Li and C. H. Henry, *Optical Fiber Telecommunications IIIB*, eds. I. P. Kaminow and T. L. Koch. San Diego: Academic Press, 1997, Ch. 8, pp. 345–351).

The great amount of interest in wavelength division multiplexing (WDM) system applications has caused a surge in devices based on fused biconically tapered (FBT) fiber couplers. In general, the technologies used to produce passive components divide them into three main categories: integrated optics, micro-optics and all-fiber devices. FBT couplers are suitable for low-cost, low port count applications. Planar integrated-optic components are ideal for network branching applications requiring 16, 32 or higher port count. However, micro-optic couplers and wavelength splitters are more suitable for high-performance systems (R. Chua, *FiberOptic Product News*, November 1998, pp. 31–34).

In its simplest form, a FBT fiber coupler consists of two optical fibers whose optical cladding has been fused together. The structure is tapered by elongation while it is hot until appropriate coupling properties are achieved. It is then bonded to a substrate and encapsulated into a compact and rugged package. This is shown in FIG. 2. Unfortunately, FBT's are polarization dependence and consequently exhibit polarization dependent loss (PDL) in a system. As in any two-path interferometer, the optical path difference must be large to yield high spectral selectivity. However, since the fiber coupler is a birefringent structure, longer length leads to greater polarization dependence. The FBT coupler of FIG. 2 behaves much like the MZI of FIG. 1, where the optical path difference between the two arms results in a sinusoidal wavelength response. However, unlike the FBT the MZI has a very small polarization dependence and PDL because the couplers themselves in FIG. 1 are very short (F. Gonthier, *FiberOptic Product News,* September 1998, pp. 54–56).

Recently UV-induced fiber Bragg gratings have been making a tremendous impact on fiber-optic communications. The gratings an be created directly in the germanium-doped core of optical fibers by holographic interference techniques, using phase or amplitude masks, or by point-by-point writing techniques (c.f. .A. E. White an S. G. Grubb, *Optical Fiber Telecommunications IIIB,* eds. I. P. Kaminow and T. L. Koch. San Diego: Academic Press, 1997, Ch. 7, pp. 273–276). At first, the photosensitivity of ordinary transmission fiber was too weak to write the strong gratings of interest for applications. The invention of a sensitization process called hydrogen loading in 1993 made it possible to write useful gratings in standard fiber, enabling a host of practical applications (P. J. Lemaire, R. M. Atkins, V. Mizrahi and W. A. Reed, *Electronics Letters,* Vol. 29, pp. 1191–1193). In this process, the fiber is exposed to high-pressure (20–750 atm) hydrogen or deuterium at moderate temperatures (21–75 C.) for up to a week. Hydrogen loading makes a germanium-doped fiber controllably photosensitive. Without the loading, index changes that have been observed are on the order of $10^{-4}$. With hydrogen loading, index changes as large as $10^{-2}$ have been achieved. The unreacted hydrogen diffuses out during a subsequent annealing process.

Thus, whereas much work was done on FBT couplers and MZI in the 1980's, much of the focus on new devices in the 1990's has centered around fiber Bragg gratings. What has changed since the 1980's and early 1990's is that much larger index changes can now be induced in optical fibers through light exposure.

Thus with the advance of enhancing the photosensitivity of optical fibres it becomes possible and practicable to use light exposure in new and previously impracticable uses. For example, in accordance with this invention, light exposure can be used to unbalance symmetric MZI's for practical applications in filters, gain flattening and equalization elements, and band splitters and combiners in accordance with this invention.

It is an object of the invention to use light exposure to unbalance a symmetric MZI structure made from substantially the same fiber of substantially the same length. In particular, it is an object of this invention to unbalance a substantially symmetric MZI by exposing at least one of the arms of the MZI to light to change the index of refraction.

It is object of the invention to manufacture environmentally stable and mechanically tunable MZI's with substantially identical fibers in physical contact. Physical contact of the fibers prevents differential bending and differential thermal fluctuations between the cores. In addition, these components can be tuned in a controllable fashion by bending the phase-shifting regions between the couplers or the couplers themselves.

It is yet object of the current invention to make fiber-based MZI with two coupler regions surrounding two or more substantially same fibers of substantially the same length with unbalancing occurring through the use of a means of altering the index of refraction of at least one fiber arm.

It is another object of this invention to induce an index change $\Delta n$ over at least a section of one arm of the fiber-based MZI $L_{exp}$ such that the frequency spacing between peak and null for the transmission through the device is given by $\Delta f = c/(2 \Delta n L_{exp})$.

It is another object of this invention to accurately tailor the spectral response of the MZI device by monitoring the MZI with a broadband light source and an optical spectrum analyzer during the light exposure process. The precise amount of differential phase shift can be controlled by adjusting the exposed fiber length, the exposure time, the intensity of the light, the degree of hydrogen loading of the fiber and the doping of the fiber.

It is another object of the current invention to increase the yield during the manufacturing process by using light exposure within some length of the remaining arm of the MZI to trim and compensate for any overexposure during the first light induced index change stage in the first arm.

It is yet another object of this invention to cascade the light-exposed unbalanced MZI so as to create lattice devices such as Lyot-Ohman filters or Solc filters for applications such as gain equalizers or band splitters. The light exposure in different sections of the MZI's can be varied to vary the phase shift in each section, and the coupling ratios of the couplers used in the cascade can be tailored to achieve the desired transmission function.

It is another object of the current invention to cascade MZI to make Fourier filters. A major advantage of using light exposure to unbalance symmetric MZI's is the flexibility of changing the index in either the top or bottom arms in cascaded devices. Irradiating either the top or bottom arms of the MZI can create both positive and negative phase shifts. The phase shifts and coupling ratios can also be varied in each stage of the Fourier filter.

Moreover, it is an object of the current invention to use light exposure or other index altering means to unbalance a symmetric MZI made in planar waveguide structures.

Finally, it is another object of the current invention to use light exposure or other index altering means in more general fiber-based or waveguide interferometric structures such as Michelson or Sagnac interferometers.

The advantages gained through the current invention over the prior art are:

The MZI in accordance with this invention exhibits a low polarization sensitivity and low polarization dependent loss since substantially the same fiber is used in both arms. Any remaining polarization sensitivity comes from the couplers. However, this sensitivity will still be much lower than for fused taper couplers;

The MZI in accordance with this invention operates optimally over a wider wavelength or frequency range, since the same fiber is used in both arms, the two arms track each other in wavelength;

The MZI in accordance with this invention has low environmental sensitivity since substantially the same fibers of substantially the same length are used in physical contact with one-another;

The quality control during the manufacturing process of the MZI in accordance with this invention is high through appropriate monitoring and control of the fabrication parameters during the light exposure stage. In addition, the yield of the manufacturing can be high since the second arm of the MZI can be light exposed to trim and compensate for any overshoot during the original light exposure step; and, Fourier filters, which require that either the top or bottom arm of the MZI be light exposed, can uniquely be made through the current invention by shifting the light exposure between the two arms of the MZI.

In contrast, it is much harder to make Fourier filters from MZI's consisting of two dissimilar fibers; and, Loop mirrors or Sagnac mirrors can be made that maintain the state-of-polarization by using light exposure to induce birefringence in the fiber or waveguide;

SUMMARY OF THE INVENTION

In accordance with the invention, there is provided, a method of making an interferometric optical filter comprising the steps of:

a) providing a splitter and combiner;

b) providing two arms coupled to the splitter and combiner, the two arms each having a core and a cladding, the arms being substantially same optical path length and having substantially similar mode field diameters along the length thereof; and, c) irradiating a region of one of the two arms with light of a suitable intensity and duration so as to vary the refractive index n over a region of length L in a substantially uniform manner of said one of the two arms to provide a refractive index difference $\Delta n$ and an optical path length difference between the two arms to effect a change $\Delta f$ in the sinusoidal spectral response of the filter and, where $\Delta f$ is the spacing between peak and null wavelengths, such that $L\Delta n = c/2\Delta f$.

In accordance with the invention there is further provided, a method of making an optical filter comprising the steps of:

a) providing an MZI having two substantially similar arms disposed between two optical couplers, the arms each having a core and a cladding and having a substantially same optical path length;

b) irradiating one of the two arms with light of a suitable intensity and duration so as to vary the refractive index of an irradiated region and to provide a difference in the optical path lengths of the two arms such that light divided by one of the couplers propagating along the two arms will be phase shifted when combined by the other of the couplers.

In accordance with the invention, there is further provided, a method of making an optical filter comprising the steps of:

a) providing an optical coupler for splitting and coupling light to or from two arms, the two arms being substantially similar in mode field diameter, the arms each having a core and a cladding and having a substantially same optical path length;

b) irradiating a region of at least one of the arms of the two arms with light of a suitable intensity and duration so as to vary the refractive index of the irradiated region substantially uniformly to vary the optical path length of at least one of the two arms and to provide a phase offset for light propagating within the two arms.

In accordance with another aspect of the invention, there is further provided, an optical filter comprising:

an optical coupler for splitting and coupling light;

two unbalanced optical waveguide arms directly coupled with the optical coupler, the arms being substantially similar along their length other than having a dissimilarity caused by a refractive index change in at least one light irradiated region in at least one of the waveguides providing a difference in optical path length and refractive index between the arms that would otherwise not exist in the absence of light irradiation of at least one of the arms.

In accordance with this invention, it is preferred that the pair of waveguides for example in a Mach Zehnder interferometer disposed between two couplers are as identical as possible prior to the irradiating step. Of course, it is understood that substantially similar includes variations in mode field diameter, in some instances of up to 30%. Notwithstanding, it is preferred to have a smaller dissimilarity.

BRIEF DESCRIPTION OF THE DRAWINGS

Exemplary embodiments of the invention will now be described in conjunction with the drawings in which:

FIGS. 7a and 7b illustrates examples of lattice devices, wherein FIG. 7a illustrates Lyot-Ohman filters made by cascading MZI's, where one output of each stage of MZI is fed to the input of the next stage and FIG. 7b illustrates a Solc filters made by cascading MZI's, where both outputs of each stage of MZI is fed to both inputs of the next stage.

FIG. 8a is a schematic diagram of lattice filters, where the same arm of each stage of MZI is irradiated.

FIG. 8b is a schematic diagram of Fourier filters, where irradiating different arms can change the sign of the phase shift.

FIG. 8c is a schematic diagram of a Fourier filter for band splitting 1310 nm and 1550 nm.

FIG. 8d is a schematic diagram of a Fourier filter for gain equalization of erbium-doped fiber amplifiers.

DETAILED DESCRIPTION

Figure 1:
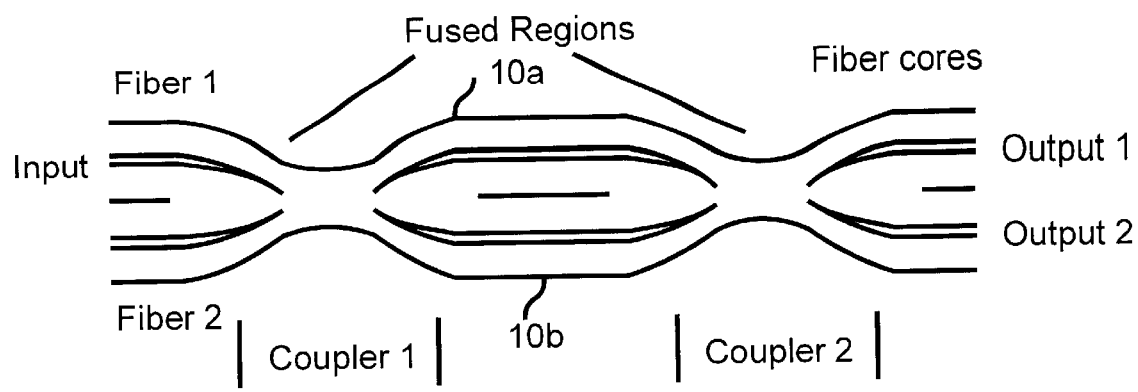
FIG. 1 is a schematic diagram of a Mach-Zehnder interferometer.
Figure 2:
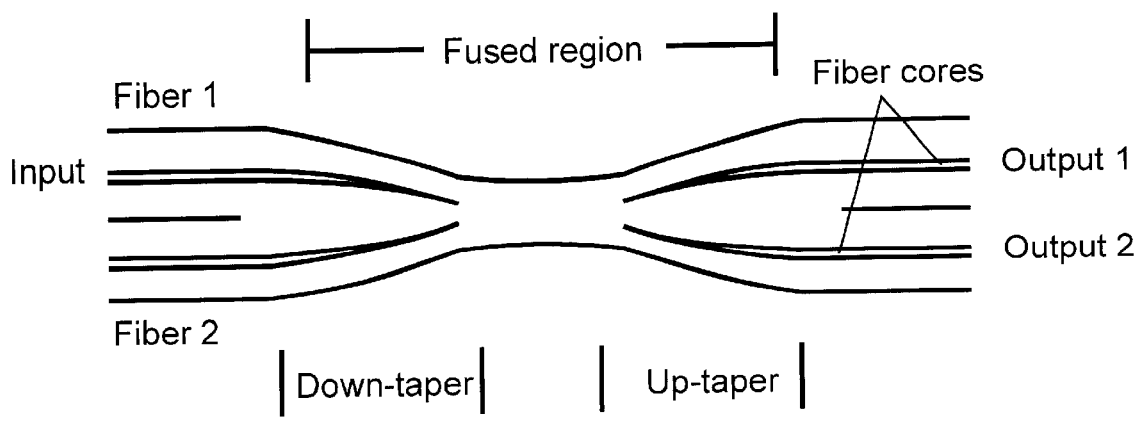
FIG. 2 is a schematic of a fused biconically tapered coupler.
Figure 3:
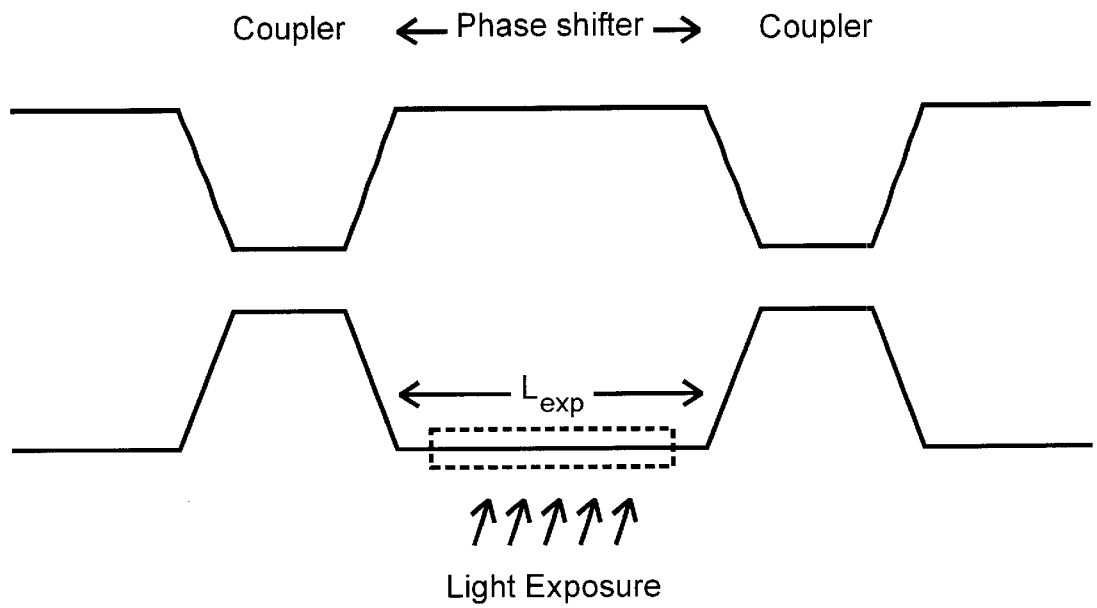
FIG. 3 is an illustration wherein light exposure of one arm of the MZI is shown for providing an imbalance a symmetric MZI.

An MZI consists of two couplers surrounding a two-branch phase shifter, as shown schematically in FIG. 3. In a typical device the couplers are 50:50 (so-called 3 dB) couplers, although there is no requirement that the coupling ratio be equal. If 3 dB couplers are used and the phase shift in the two arms are identical, then regardless of the wavelength the light from the upper input port emerges at the lower output port, and light from the lower input port emerges at the upper output port. To induce a spectrally dependent behavior in an ideal MZI, there must be a differential phase shift between the two arms between the couplers.

According to the current invention, light exposure to change the index of refraction in at least one arm of the MZI can be used to unbalance a symmetric MZI. As shown in FIG. 3, light can be used to irradiate or expose a length $L_{exp}$ of one arm of the MZI. In general, $L_{exp}$ can be shorter or equal to the length of the phase shifter section. Also, the index change $\Delta n$ over $L_{exp}$ can be adjusted by adjusting the irradiation time and the light intensity. Typically the light used for irradiation is in the UV wavelength range. The path length difference induced by this method is given by $\Delta L_{eff} = \Delta n\, L_{exp}$.

To achieve the desired spectral dependence, it is convenient to monitor the MZI's spectral behavior while light irradiating the device. For example, a broadband or white light source can be coupled into one of the input ports of the MZI, and one or both of the output ports of the MZI can be monitored using detectors or an optical spectrum analyzer. The desired spectral behavior can be adjusted by varying the parameters of the exposure to vary $\Delta n$ and by varying the length of the exposure $L_{exp}$. Also, $L_{exp}$ can be made longer by stepping the UV light or slit over to expose large sections step-by-step. Note that the exposure time can be reduced and the index change can be increased by hydrogen loading the device.

Figure 4:
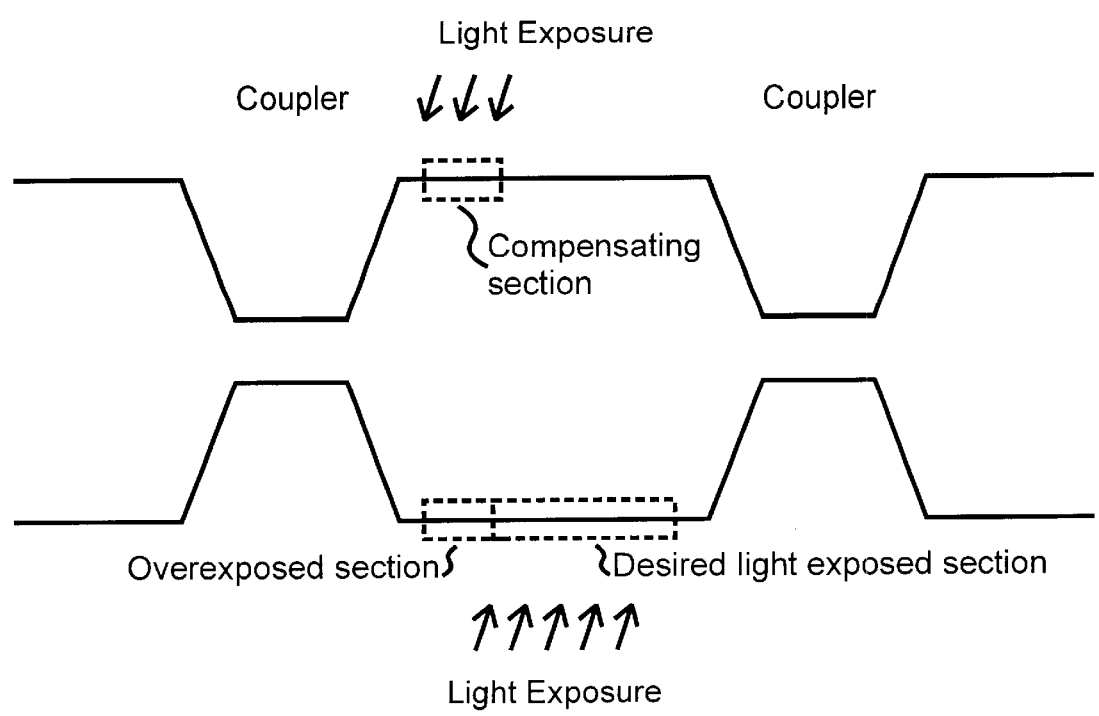
FIG. 4 is an illustration wherein light exposure of one arm of the MZI is shown for providing an imbalance a symmetric MZI and further illustrates an instance wherein the manufacturing yield can be made high by trimming any overexposure by light irradiating a compensating section in the second MZI arm.

The manufacturing process can be made to have a high yield. This is because an overexposed MZI can be corrected by light exposure of the second arm (FIG. 4). For the MZI, only the relative index or phase difference between the two arms matters. If too much exposure of one arm has occurred, then balancing the overexposure by irradiating the second arm of the MZI to trim the response and cancel the difference can compensate the processing.

Figure 5:
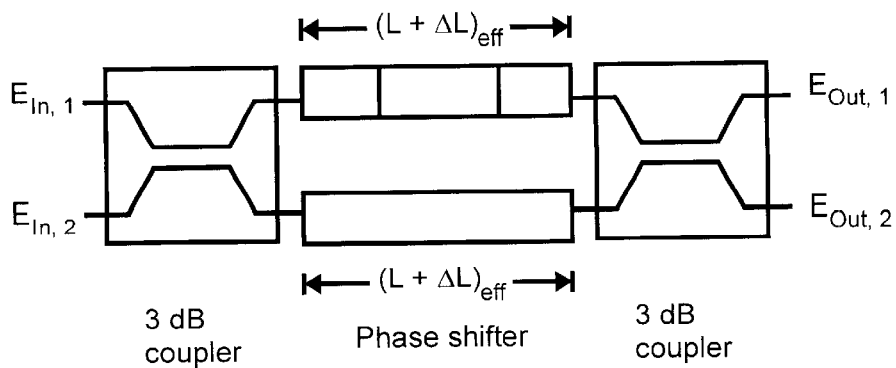
FIG. 5 illustrates an exemplary MZI structure for spectral dependence calculations.

Note that although much of the above discussion has focused on optical fibers as an example, the concept applies to other optical structures as well. For example, planar waveguide devices can also use light exposure to unbalance the MZI. Whereas different fiber lengths for the two arms of a fiber-based MZI significantly increases the environmental sensitivity, having equal arms in a planar waveguide device is not as critical because the integrated device can be stable even with unequal arm lengths. Also, UV light exposure is currently a preferred means by which to increase the index of refraction of optical fibers. However, it should be clear that other means to alter the index of refraction of the fiber are also applicable to the invention. For example, pressure, applied electric fields, or acoustic waves might alter the index if applied differentially to only one arm of the MZI. Exemplary Calculations of the Spectral Dependence for MZ Interferometers Consider the simplest building block, which is a 2×2 MZI with 3 dB couplers. Each 2×2 MZI consists of three stages: a 3-dB coupler, a two-branch phase shifter, and another 3-dB coupler (FIG. 5). For a more complete description of this structure, c.f., M. M. K. Liu, *Principles and Applications of Optical Communications;* Irwin: 1996, pp. 457–461. The phase shift between the two arms is given by $$\Delta\phi = k\Delta L_{eff};\ k = 2\pi/\lambda;\ \Delta L_{eff} = \Delta(nL)$$

If the two arms are of equal length, then $$\Delta L_{eff} = L\Delta n$$

If the incident light inputs $E_{in,1}$ and $E_{in,2}$, are at wavelengths $\lambda_1$ and $\lambda_2$, then the output power is $$P_{out,1} = P_{in,1} \sin^2(k_1 \Delta L_{eff}/2) + P_{in,2} \cos^2(k_2 \Delta L_{eff}/2)$$

and $$P_{out,2} = P^{in,1} \cos^2(k_1 \Delta L_{eff}/2) + P_{in,2} \sin^2(k_2 \Delta L_{eff}/2)$$

where $k_1 = 2\pi/\lambda_1$ and $k_2 = 2\pi/\lambda_2$.

To multiplex or demultiplex two wavelengths $\lambda_1$ and $\lambda_2$, it is required that $$(k_1 - k_2)\Delta L_{eff} = \pi = (2\pi/\lambda_1 - 2\pi/\lambda_2)\Delta L_{eff}$$

Since $\lambda = c/f$ where c is the speed of light, the above expression can also be written as $$2\pi/c(f_1 - f_2) = 2\pi/c\Delta f = k_1 - k_2$$

Figure 5A:
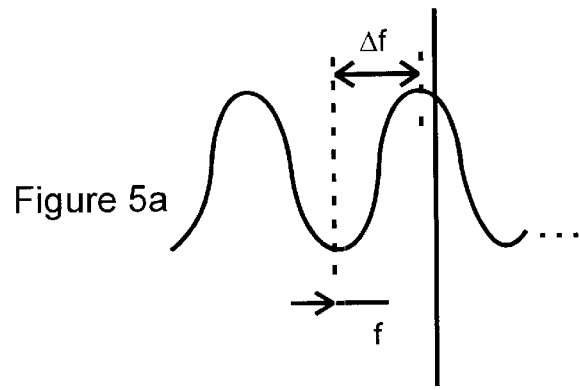
FIG. 5a is graph illustrating $\Delta f$ for a sinusoidal output response.

Therefore, if $\Delta f$ is the spacing as shown FIG. 5a, between peak and null wavelengths for the device then we arrive at the desired relation between the effective length change and the sinusoidal spectral response $$\Delta f = c/(2\Delta L_{eff});\ \Delta L_{eff} = c/(2\Delta f)$$

With hydrogen loading of fibers, index changes of $\Delta n \sim 3 \times 10^{-3}$ can be achieve regularly. We shall use this figure in all of the following examples.

EXAMPLE 1

Figure 6:
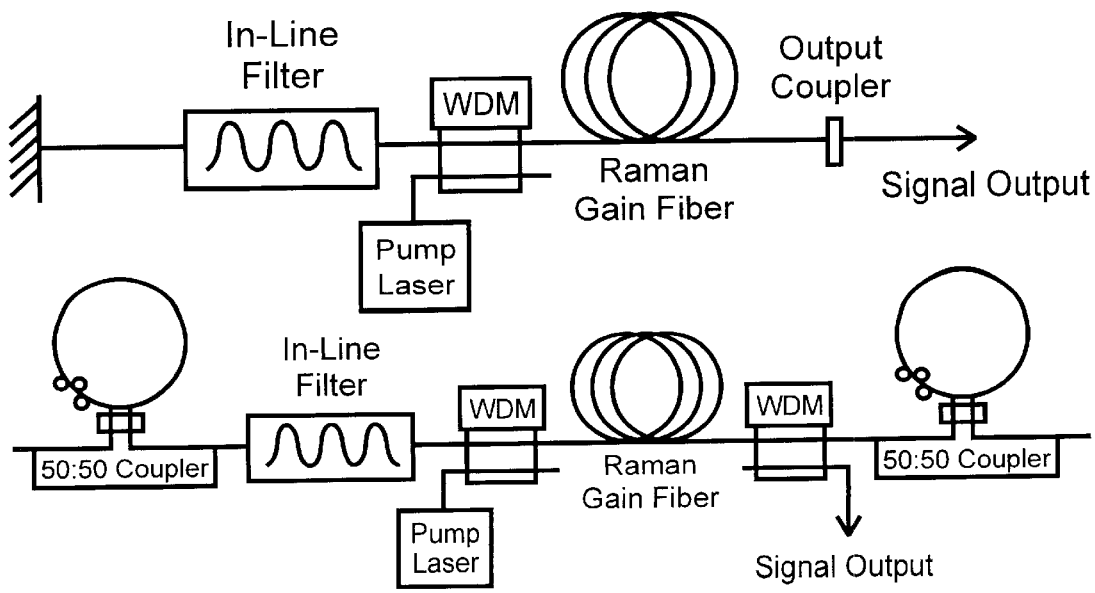
FIG. 6 is a schematic diagram of a Raman oscillator using a MZI filter.

One way of making a Raman oscillator is to place a periodic filter in the laser cavity that has the periodicity corresponding to a Raman cascade order, or a multiple or sub-multiple of the Raman cascade order, see FIG. 6. Suppose that we want the peaks of the transmission filter to correspond to the Raman cascade orders. The length of the MZI that should be exposed can be determined.

Each Raman cascade order in fused silica fiber is separated by 13.2 THz (i.e., peak-to-peak separation). Therefore, we want $\Delta f = 6.6$ THz, since this is the separation between peak and null. For an index change of $\Delta n = 3 \times 10^{-3}$, the irradiated length should be $$L = \frac{c}{2\Delta n \Delta f} = \frac{(3e8)}{2(3e-3)(6.6e12)} = 0.76 \text{ cm} = 7.6 \text{ mm.}$$

If the MZI length is longer, then the light exposure can be reduced. Alternately, only a part of one arm of the interferometer can be exposed to light irradiation.

EXAMPLE 2

Suppose, instead, that we want the peaks of the transmission filter to correspond to alternate Raman cascade orders. Then, we want $\Delta f = 13.2$ THz, since this is the separation between peak and null. For an index change of $\Delta n = 3 \times 10^{-3}$, the irradiated length should be $$L = \frac{c}{2\Delta n \Delta f} = \frac{(3e8)}{2(3e-3)(13.2e12)} = 0.38 \text{ cm} = 3.8 \text{ mm.}$$

Again, either the light exposure can be varied or only part of the MZI arm can be exposed to trim the frequency response.

EXAMPLE 3

As an alternate design, suppose that we want there to be four peaks of the transmission filter within one Raman cascade order. Then it is desired to have $\Delta f = 1.65$ THz. For an index change of $\Delta n = 3 \times 10^{-3}$, the irradiated length should be $$L = \frac{c}{2\Delta n \Delta f} = \frac{(3e8)}{2(3e-3)(1.65e12)} = 3.03 \text{ cm.}$$

Again, either the light exposure can be varied or only part of the MZI arm can be exposed to trim the frequency response.

EXAMPLE 4

Consider the problem the other way around. If the MZI arm is 4 cm long, and the maximum index change is $\Delta n = 3 \times 10^{-3}$. The smallest $\Delta f$ possible for this situation can be determined. We have then $$\Delta f_{min} = \frac{c}{2L\Delta n} = \frac{(3e8)}{2(4e-2)(3e-3)} = 1.25 \text{ THz.}$$

Therefore, this MZI will be poor for selecting particular WDM channels, which are typically spaced around 100 GHz. However, the MZI is a good building block for broader bandwidth devices, as detailed below.

More Complicated Spectral Functions Using Lattice and Fourier Filters

Figure 7A:
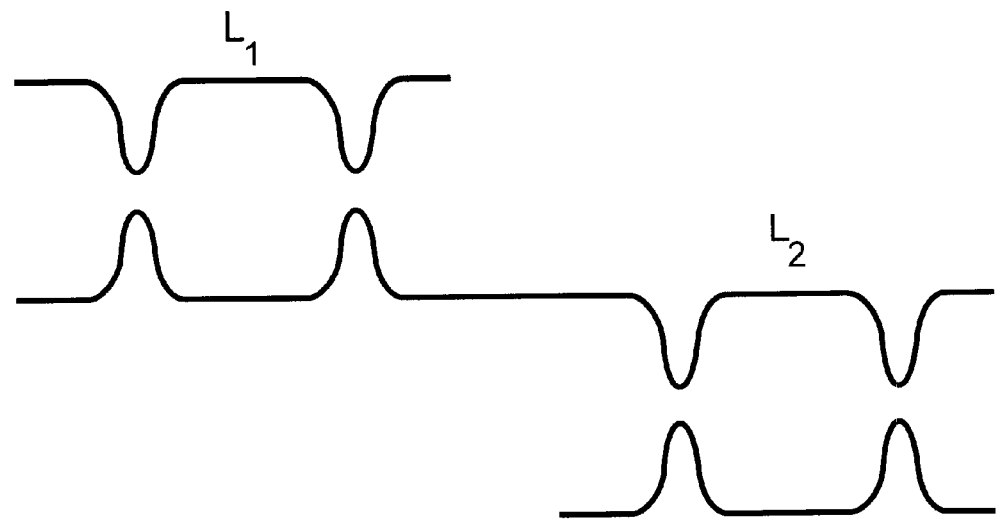

Although the above examples have focussed on a periodic transmission filter for use in Raman oscillators or amplifiers, there are many other applications for MZI. As mentioned earlier other applications include WDM filters, wavelength band splitters and gain flattening elements. For example, by concatenating several MZI where the phase shift region is different, Lyot-Ohman filters can be implemented (c.f. P. Yeh, *Optical Waves in Layered Media.* Wiley, 1988). In a Lyot-Ohman filter, one output from each stage of the MZI is fed to the next MZI stage (FIG. 7a). However, Lyot-Ohman filters cannot be concatenated to provide for arbitrary filter functions.

Figure 7B:
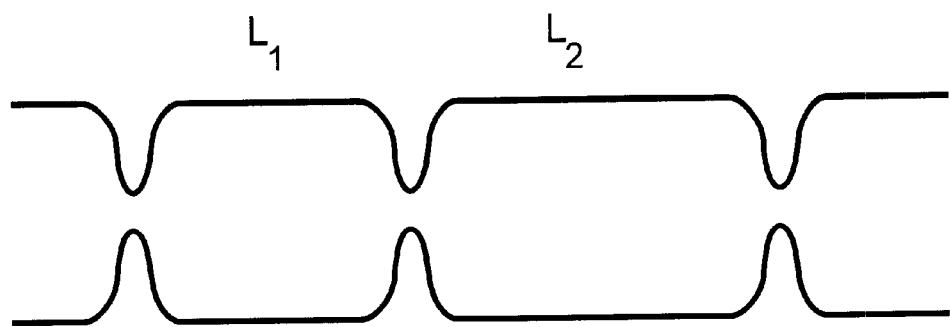

Band filters or notch filters can be fabricated using Solc filters (D. A. Nolan, IEEE International Passive Components Workshop, September 1998). In these filters, the phase information is retained throughout, and no output port is dropped as in the Lyot-Ohman filter. i.e., As shown in FIG. 7b, both outputs of one MZI stage are fed into the next MZI stage's two inputs. In general, broad band filters require the Solc design.

More complicated filter designs using multiple MZI's have been studied for planar waveguide structures. For example, lattice structures have been theoretically studied for synthesis of coherent two-port lattice-form optical delay-line circuits (K. Jinguji and M. Kawachi, *Journal of Lightwave Technology*, Jan. 1, 1995, Vol. 13, pp. 73–82). Using calculated coupling coefficients and phase shifts that are different in each MZI stage, three design examples for optical frequency filters have been shown: a linear-phase Chebyshev filter, a multi-channel selector, and a group delay dispersion equalizer. Unfortunately, to achieve the ideal transfer functions requires the use of 15 to 23 stages of MZI.

Another generalization of the MZI is a Fourier filter, which consists of a chain N (N>2) optical couplers of different coupling ratios linked by N−1 differential delays of different lengths. If the differential delays are multiples of a fundamental delay, the transfer function is periodic (Y. P. Li and C. H. Henry, *Optical Fiber Telecommunications IIIB*, eds. I. P. Kaminow and T. L. Koch. San Diego: Academic Press, 1997, Ch. 8, pp. 345–351). Compared with optical lattice filters, the Fourier filter is directly based on Fourier expansion and is more general in structure. For example, in Fourier filters the differential delays are not limited to equal lengths with the same sign as in lattice filters. The length can be negative in a Fourier filter, which means that the longer effective length is in the other MZI arm. Using the Fourier filters, two stages have been cascaded to implement a 1310 nm/1550 nm band splitter. In addition, a six-stage Fourier filter has been used to implement an erbium-doped fiber amplifier gain equalization filter.

Symmetric MZI with light irradiation for unbalancing can be used as a fundamental building block both in lattice and Fourier filters. It is important to note that the light irradiation unbalancing gives a key flexibility for producing Fourier filters. For example, MZI's made from dissimilar fibers can be used to produce lattice devices, but they cannot conveniently be applied to Fourier devices. This is because the more general Fourier devices require either positive or negative phase shift regions. Since the position of the dissimilar fibers is usually not altered, only one sign of phase shift is obtained. For the purpose of this invention, it is preferred that the two fibres be as similar as possible, in fact it is preferred that they be from the same manufacturing batch; however, in some instances there may be some difference between the fibres. Hence for the scope of this invention, it is preferred that the waveguides do not differ from one another by more than 30 percent.

Figure 8A:
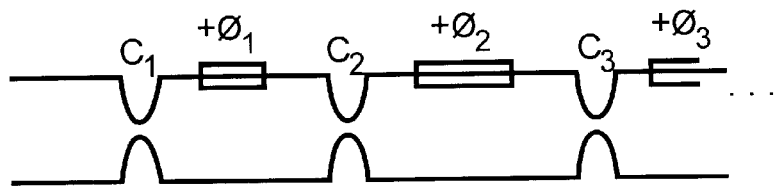
FIGS. 8a to 8d are illustrations of light-induced phase shift sections that can be used in the top or bottom arm of the MZI to make Fourier filters.
Figure 8B:
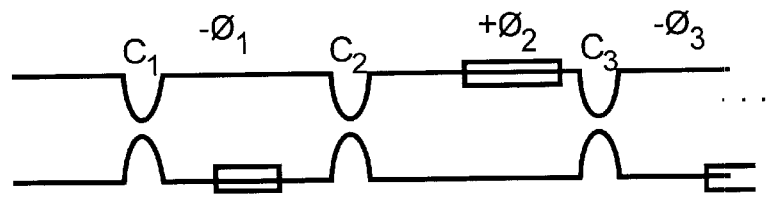
Figure 8C:
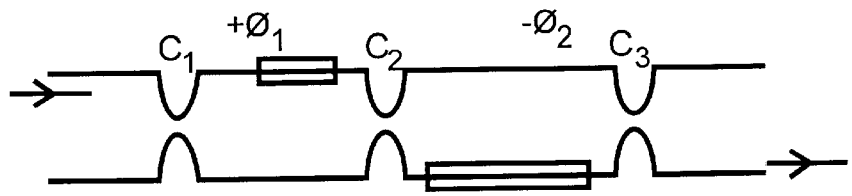
Figure 8D:
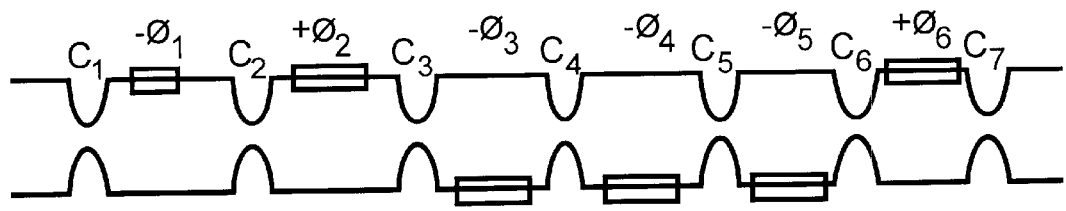

With the light irradiation unbalancing, either sign of phase shift can be achieved by irradiating either the top or bottom arm of the MZI. As a convention, we choose to let the phase shift be positive when the top arm is irradiated and negative when the bottom arm is light exposed. This is because the irradiated arm will generally have a higher index of refraction or effectively a longer length and a larger phase shift. If the same arm of each stage is irradiated, then a lattice device results (FIG. 8a). By shifting the exposure to the top or bottom arms of each stage, Fourier filters can be produced (FIG. 8b). As an example, these Fourier filters can be used to implement band splitters or gain equalization elements. For instance, as shown in FIG. 8c, band splitters can be made using two stages of light-exposed MZI's (c.f. Y. P. Li, C. H. Henry, E. J. Laskowski, H. H. Yaffe, and R. L. Sweatt, *Electronic Letters*, vol. 31, pp. 2100–2101, 1995). Alternately, as shown in FIG. 8d, gain equalizers for optical amplifiers can be made with six stages of light-exposed MZI's (c.f. Y. P. Li, C. H. Henry, E. J. Laskowski, C. Y. Mak and H. H. Yaffe, *Electronic Letters*, vol. 31, pp. 2005–2006, 1995). Therefore, a major advantage of using light-exposure to unbalance symmetric MZI's is the flexibility of changing the index of refraction in either the top or bottom arm in cascaded devices.

Light-induced Index Changes in Other Interferometric Structures

Figure 9A:
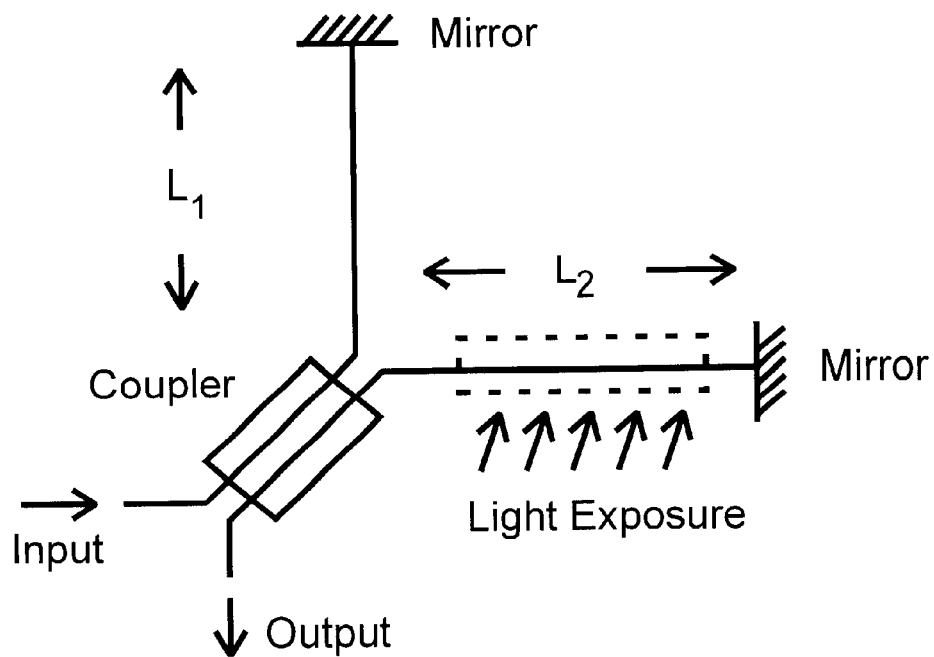
FIG. 9a is a schematic diagram of a Michelson interferometer, whose spectral characteristics are tuned by light exposure of at least one arm of the Michelson.

Whereas the discussion thus far has centered on MZI's, it should also be clear that light-exposure to change the index-of-refraction can be applied more generally to other fiber-based or waveguide interferometric structures. For example, two other examples of interferometers include Michelson interferometers and Sagnac interferometers or loop mirrors. A Michelson interferometer consists of a beam splitter or coupler with two arms terminating generally in mirrors (FIG. 9a). Like an MZI, the output from the Michelson is a sinusoidal function that depends on the relative phase shift between the two arms. Therefore, the path length difference between the two arms sets the spectral characteristics of the Michelson. Just as in the MZI shown in FIG. 3, light exposure can be used to create the desired path difference between the two arms. Additionally, if the path length difference is exceeded, then exposing the other arm of the interferometer as shown in FIG. 4 can compensate the over-exposure.

Figure 9B:
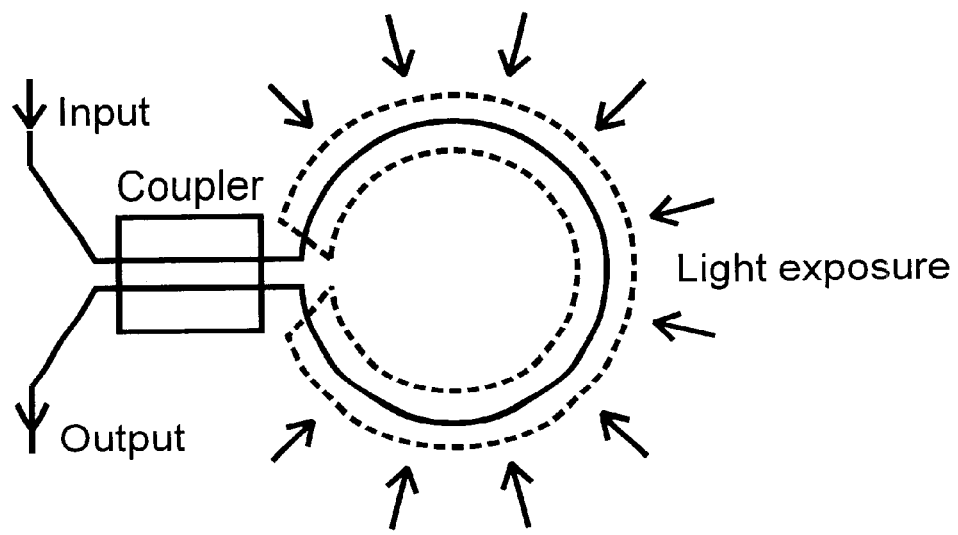
FIG. 9b is a schematic diagram of a Sagnac interferometer or loop mirror in which the light exposure is used to introduce birefringence into the fiber or waveguide, thereby rendering it polarization maintaining.

Another example of an interferometer is a Sagnac interferometer or loop mirror, as shown in FIG. 9b. The loop mirror consists of a coupler whose two ports are connected with a waveguide or fiber. When the coupler is a 3 dB coupler or 50:50 coupler, then the device acts as a mirror—i.e., all of the input is reflected backwards into the input port. One difficulty with a loop mirror is that the state of polarization for the clockwise and counter-clockwise paths must be the same for there to be complete interference at the coupler. One means of achieving this is to use a polarization-maintaining fiber in the loop. Alternately, one can start with a very low birefringence fiber, such as so-called spun fiber (a fiber that is twisted back and forth during the pulling process to randomize the birefringent axes, thereby effectively canceling or significantly reducing the background birefringence). Then, light exposure to the entire loop mirror can be used to introduce birefringence in the loop. In other words, the index for the axis of the fiber or waveguide exposed to light will be higher than the index in the orthogonal polarization. When sufficient birefringence is introduced, the fiber in the loop becomes effectively polarization maintaining. For the polarization-maintaining fiber, the state of polarization can be identical for both directions around the loop.

Note that there are two means of inducing birefringence in an optical fiber using ultraviolet light. In the first means, the ultraviolet is unpolarized and it is the direction of the light radiation that results in a refractive index anisotropy being induced in the optical fiber. This method has been used to induce large birefringence in optical fibers that have been hydrogen loaded. In the case of the optical fiber loop, the direction of the radiation can be as depicted in FIG. 9b or perpendicular to the plane of the loop. The second means for inducing birefringence in an optical fiber requires the use of polarized light. In this case it is the direction of the polarization of the ultraviolet light with respect to the axis of the optical fiber that is important. The induced birefringence results from the fact that there is dichroism in the absorption of the ultraviolet light in the fiber core.

A further note is that interferometric structures are normally formed using beam splitters or directional couplers. The coupler performance characteristics, particularly its spectral and polarization properties, affect the performance characteristics of the final interferometric structure. Thus, it should be clear from the above discussion that characteristics of the directional coupler itself can be altered by exposing to light the core of at least one of the optical waveguides forming the coupler. An important application is the reduction or elimination of the birefringence that is present in long, highly wavelength selective optical couplers.

It is understood that various other modifications will be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

What is claimed is:

1. A method of making an interferometric optical filter comprising the steps of:
    a) providing a splitter and combiner;
    b) providing two arms coupled to the splitter and combiner, the two arms each having a core and a cladding, the arms being substantially same optical path length and having substantially similar mode field diameters along the length thereof; and,
    c) irradiating a region of one of the two arms with light of a suitable intensity and duration so as to vary the refractive index n over a region of length L in a substantially uniform manner of said one of the two arms to provide a refractive index difference $\Delta n$ and an optical path length difference between the two arms to effect a change $\Delta f$, where $\Delta f$ is the spacing between a peak and null wavelength of the spectral response of the filter.

2. A method as defined in claim 1 wherein $\Delta f$ is a sinusoidal spectral output response of the filter and wherein $L\Delta n$ is substantially equal to $c/2\Delta f$.

3. A method of making an interferometric filter as defined in claim 2 wherein the splitter and combiner comprises a first and second optical coupler each providing a splitting and/or combining function, the two arms defined in step (b) being disposed between the first and second optical coupler, one of the two optical couplers for splitting light incident thereon into two branches corresponding to the two arms.

4. A method as defined in claim 2, wherein the step of irradiating a region is performed in a substantially uniform manner over the entire region of exposure to effect a substantially uniform refractive index change over said region.

5. A method as defined in claim 2 wherein the arms defined in step (a) have mode field diameters that are within 30% of each other along the length of the arms.

6. A method as defined in claim 5 wherein the refractive index along the core of each of the two arms is substantially uniform and wherein the refractive index difference between the two arms is no greater than 10% prior to said irradiating step (b).

7. A method of making an optical filter comprising the steps of:
    a) providing an MZI having two substantially similar arms disposed between two optical couplers, the arms each having a core and a cladding and having a substantially same optical path length;
    b) irradiating one of the two arms with light of a suitable intensity and duration so as to vary the refractive index of an irradiated region and to provide a relative difference in the optical path lengths between the two arms such that light divided by one of the couplers propagating along the two arms will be phase shifted when combined by the other of the couplers, wherein the refractive index remains varied for a substantial time after the step of irradiating is completed.

8. A method as defined in claim 7 wherein the step of irradiating is performed substantially uniformly and wherein the two substantially similar arms in step (a) have mode field diameters within 30% of one another.

9. A method of making an optical filter comprising the steps of:
    a) providing an optical coupler for splitting and coupling light to or from two arms, the two arms being substantially similar in mode field diameter, the arms each having a core and a cladding and having a substantially same optical path length;
    b) irradiating a region of at least one of the arms of the two arms with light of a suitable intensity and duration so as to vary the refractive index of the irradiated region substantially uniformly to vary the optical path length of at least one of the two arms and to provide a phase offset for light propagating within the two arms, wherein the refractive index remains varied for a substantial time after the step of irradiating is completed.

10. A method of making an optical filter as defined in claim 9 further comprising the step of hydrogen or deuterium loading of at least one of the waveguide arms prior to the irradiating step.

11. A method as defined in claim 9 further comprising the step of determining ΔLeff that will provide a value of c/2Δf, where ΔLeff=LΔn and where, c is the speed of light and Δf is the spacing between peak and null wavelengths from the filter, prior to the irradiating step.

12. A method as defined in claim 9, further comprising the step of determining by detecting light output from the filter when the irradiation step (b) should be terminated.

13. A method of making an optical filter comprising the steps of:
 a) providing an optical coupler for splitting and coupling light to or from two arms, the two arms being substantially similar in mode field diameter, the arms each having a core and a cladding and having a substantially same optical path length;
 b) irradiating a region of at least one of the arms of the two arms with light of a suitable intensity and duration so as to vary the refractive index of the irradiated region substantially uniformly to vary the optical path length of at least one of the two arms and to provide a phase offset for light propagating within the two arms; and irradiating the other of the two arms with light of suitable intensity and duration to lessen the optical path length difference between the at least two arms.

14. A method of making an optical filter comprising the steps of: providing a plurality of waveguide pairs between at least three optical couplers, each of the waveguides within a pair being substantially similar in mode field diameter along their length other than having an optical path length difference between waveguide pairs caused by one or more regions having had a light induced refractive index change.

15. An optical filter comprising:
 an optical coupler for splitting and coupling light;
 two unbalanced optical waveguide arms directly coupled with the optical coupler, the arms being substantially similar along their length other than having a dissimilarity caused by a refractive index change in at least one light irradiated region in at least one of the waveguides providing a difference in optical path length and refractive index between the arms that would otherwise not exist in the absence of light irradiation of at least one of the arms having been performed and which exists for a substantial period of time after the light irradiation is completed.

16. An optical filter comprising:
 an optical coupler for splitting and coupling light; and,
 two unbalanced optical waveguide arms directly coupled with the optical coupler, the arms being substantially similar along their length other than having a dissimilarity caused by a refractive index change in at least one light irradiated region in at least one of the waveguides providing a difference in optical path length and refractive index between the arms that would otherwise not exist in the absence of light irradiation of at least one of the arms,
 wherein the arms have mode field diameters along their length that are within 30% of each other in regions of the waveguide where the refractive index has not been modified by the use of light.

17. An optical filter as defined in claim 16 further comprising a second optical coupler directly coupled with the waveguide arms such that the arms are disposed between the two couplers.

18. An optical filter as defined in claim 16 wherein the arms of the same physical length, and mode field diameter and optical path length, other than a difference provided by irradiating at least one of the arms to provide an optical path length difference.

19. An optical filter as defined in claim 16 wherein a difference in Leff of an irradiated region is equal to c/2Δf.

20. An optical filter as defined in claim 16, wherein the filter further comprises two reflectors optically coupled with the arms for reflecting light received from the coupler back to the coupler.

21. An optical filter as defined in claim 17 wherein the filter is a Mach Zehnder interferometer.

22. An optical filter as defined in claim 17 comprising a third coupler disposed to receive light from the second coupler and having a pair of waveguide arms disposed between the second and third coupler, the arms being substantially similar along their length other than having a dissimilarity caused by a refractive index change in at least one light irradiated region in at least one of the waveguides providing a difference in optical path length and refractive index between the arms that would otherwise not exist in the absence of light irradiation of at least one of the arms to permanently change the refractive index.

* * * * *